MAGNETIC MODULATOR

Original Filed March 26, 1953 2 Sheets-Sheet 1

INVENTOR.
ROBERT A. HEARTZ
BY George H Fisher
ATTORNEY

INVENTOR.
ROBERT A. HEARTZ
BY George H. Fisher
ATTORNEY

United States Patent Office
2,870,416
Patented Jan. 20, 1959

2,870,416

MAGNETIC MODULATOR

Robert A. Heartz, Utica, N. Y., assignor to Minneapolis-Honeywell Regulator Company, Minneapolis, Minn., a corporation of Delaware Continuation of application Serial No. 344,698, March 26, 1953. This application November 19, 1956, Serial No. 623,008

7 Claims. (Cl. 332—51)

My invention relates to magnetic modulators and more particularly to an improved magnetic modulator having superposed perpendicular magnetic fields to be hereinafter identified as a cross field magnetic modulator. This is a continuation application of my prior application, Serial No. 344,698, filed March 26, 1953, on a Magnetic Modulator, now abandoned.

The principle of superposed perpendicular magnetic field has been utilized previously in magnetic frequency converting devices but has not been applied to a modulating device in which a D. C. signal is modulated by an alternating current supply. It is to be understood that in modulating devices of this type that the signal voltage which is referred to as D. C. is a signal whose frequency is low compared to the supply frequency. The difficulty in prohibiting mutual induction between windings in devices of this type has made it non-feasible in application inasmuch as the outputs were subjected to extraneous signals having high harmonic components. In the subject invention, there is provided an improved magnetic modulator which utilizes the cross field magnetization principle to provide for a low input threshold or signal with an output linear in response and stable in operation. The subject invention also provides a magnetic modulator of a type in which the hysteresis effect in the magnetic core structure is substantially eliminated. Another object of this invention has been to provide in a device of this type a core structure in which perpendicular magnetic fields may be easily obtained. It is also an object of this invention to provide an improved magnetic modulator utilizing a toroidal core with windings thereon so positioned with respect to one another that mutual induction therebetween is prohibited. It is further an object of this invention to provide an improved magnetic modulator having an improved output carrier wave form and an A. C. output which is independent of signal source impedance. It is also an object of this invention to provide a magnetic modulator design which may be used as a voltage amplifier. These and other objects of this invention will become apparent from reading of the attached description together with the drawings wherein, Figure 1 is a schematic electrical circuit showing the relationship of the windings and the sources of power applied to and taken from the same.

Figure 2:
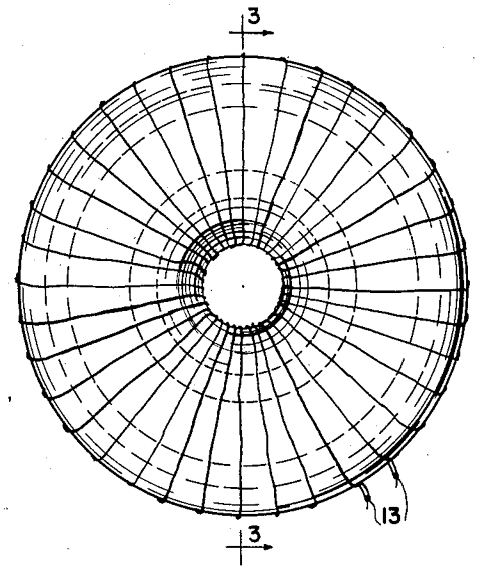
Figure 3:
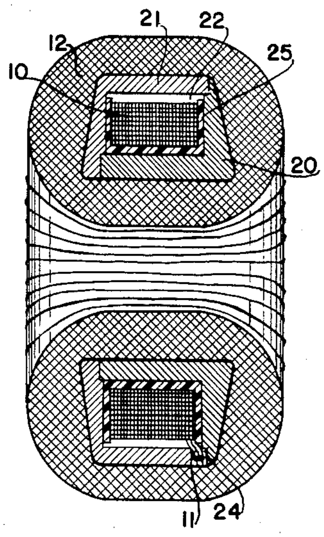
Figure 4:
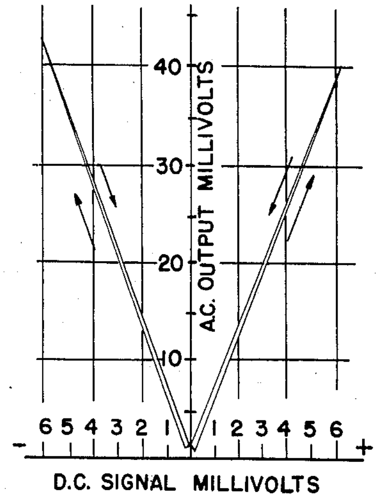
Figure 5:
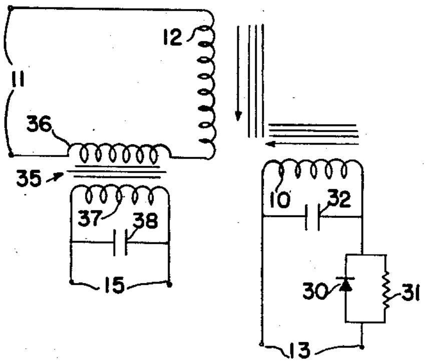
Figure 6:
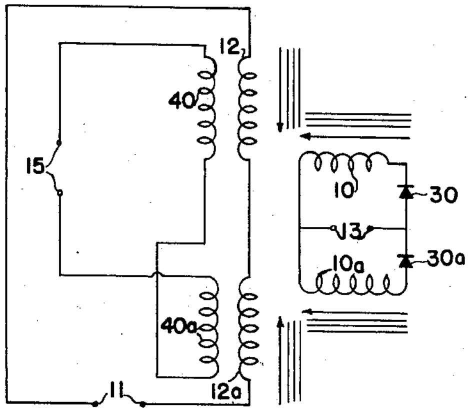

Figure 2 is a plan view of my improved cross field modulator utilizing a toroidal core and a toroidal winding, Figure 3 is a sectional view of the cross field modulator of Figure 2 taken along the lines 3—3 thereof and disclosing in section the shape of the toroidal core and the relative positioning of the windings of the same, Figure 4 is a graph disclosing the relationship or linearity between the D. C. input signal and the A. C. modulator output signal, Figure 5 is a second embodiment of the invention shown in schematic form, and Figure 6 is another embodiment of the invention shown also in schematic form.

Figure 1:
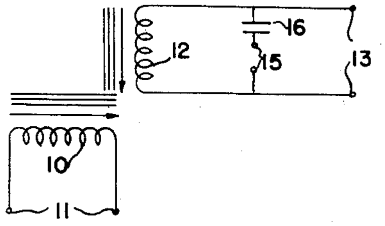

My improved magnetic modulator is shown diagrammatically in Figure 1 wherein the windings and the fields generated thereby are positioned normal to one another. However, it will be understood that a magnetic core substantially continuous in extent such as is shown in Figure 2 is associated with the windings such that the field of one winding will align the magnetic domains in one particular direction and the field of the opposite winding which is not strong enough to re-orient the particles or domain of the magnetic particles in the core structure will act in a direction normal thereto. In such a relationship, no magnetic induction exists between the windings on the core. In Figure 1 a coil 10 is designated as the alternating current field coil and adapted to be connected at its terminals 11 to an alternating current supply. A winding 12 is designated as the signal field winding and adapted to be connected at its terminals 13 to a D. C. signal source. The signal source having a frequency which is considerably lower than the supply frequency. Connected in parallel with the supply terminals 13 or across supply terminals 13 and in parallel with winding 12 is a second pair of terminals 15 to be designated output terminals and having connected in series therewith a condenser 16. The magnetic structure of this modulator is shown in its preferred form in Figure 2 in which the core structure is a toroidal core member having an aperture 22 therein and comprising two parts 20 and 21 which fit together in telescopic fashion and are designed to be held in assembled relationship to form the hollow toroidal core by suitable means not shown. Positioned within the aperture 22 of the hollow toroidal core structure is the winding 10 mounted on a spool 25. As noted above, winding 10 is the alternating current supply winding whose terminals 11 extend through an aperture 24 in the core structure to be connected to the alternating current source. Wound around the toroidal core in the form of a toroidal winding is the D. C. signal winding 12. Although not specifically shown as such in the drawings 2 and 3, the D. C. signal winding is sector wound on the toroidal core so that no complete turn in the same direction as the alternating current winding 10 exists, thereby eliminating any direct inductive relationship with the alternating current winding 10. The terminals 15 and 16 are connected external of the toroidal winding and to the extremity thereof in the same manner as the D. C. source 13 is connected thereto.

The basic premise for magnetic modulation in a device of this type is that the A. C. supply or carrier field will saturate the entire core structure or core volume. To this extent it will be noted that the core structure made up of the parts 20 and 21 is tapered toward to its outer periphery and reduced in cross-section at this point such that the magnetic flux generated by the A. C. winding will uniformly saturate the core structure. It will also be noted that the A. C. winding 10 substantially fills the aperture 22 of the core structure to minimize the air gap therebetween. Thus the cross-sectional area of the core structure as seen by the A. C. supply flux is uniform over the entire supply flux path. Although a hollow toroidal core is shown herein, it will be understood, however, that other core configurations may be utilized in which the magnetic field may be superposed upon one another the only possible limitation being the minimization of an air gap between the windings and the core structure and the air gap in the magnetic core structure. It will be understood, of course, that the influence of the magnetic fields must act perpendicular to one another on the core structure. It will also be understood that the relative positions of the A. C. and D. C. windings may be interchanged. However, to obtain the best modulated sensitivity, the toroidal winding is made the D. C. signal winding and the A. C. supply winding is positioned within the core structure. The toroidal core is so shaped that the area seen by the perpendicular A. C. flux remains constant over the entire flux path.

With the arrangement of parts described above, there will be no induced A. C. into the output winding of the device. The magnetic state of the iron in the core structure as seen from the signal winding will be determined by the A. C. supply field. When the A. C. supply is large enough to saturate the core structure, the magnetic domains are lined up in a direction which is determined by the A. C. field. The perpendicular force of the D. C. signal field is not strong enough to re-orient these magnetic domains. Thus the iron in the magnetic core structure as seen from the D. C. signal circuit reacts as an air core. When the sum of the A. C. field force and the residual field forces goes to zero, the core as seen from the D. C. signal winding reacts as a high permeability material. For a given D. C. signal supplied to the D. C. winding, the signal flux will vary with the permeability of the magnetic core structure and there will be an A. C. voltage developed across the signal winding. In the embodiment discussed above, this A. C. voltage will be a second harmonic of the alternating current supply because the core structure saturates twice during each cycle of the supply frequency. As will be later noted, this A. C. output can be made fundamental or of the same frequency as the A. C. supply should the A. C. supply be biased so that the core structure saturates only once during each cycle.

As indicated above, the shape of the magnetic core structure achieves the uniform area as seen by the A. C. flux path or A. C. flux thereby eliminating hysteresis effect in the device. Further, the magnetic core structure or the parts 20, 21 in the preferred embodiment are made of a powdered magnetic material such as a Ferrite having a high magnetic permeability. By using a powdered iron core, the shorted turn and eddy current effect is negligible or eliminated. Such cores are readily fabricated by placing powdered metal in a suitable die, pressing it into a desired shape and hardening the same. By reducing the shorted turns and eddy currents affecting the core structures, the response time of the modulator is greatly improved.

Reference is made to Figure 4 showing linearity of the device or relationship of the D. C. signal to the A. C. output of the same. A condenser 15 is connected in series with the A. C. output terminal to eliminate the D. C. signal therefrom.

The second harmonic modulator may be converted into a fundamental output modulator by supplying the device with a D. C. biased A. C. supply current or by supplying it with a half wave A. C. supply as shown in the embodiment of Figure 5. In this figure, it will be seen that the A. C. supply winding 10 has in series therewith a rectifier 30 which is connected in series between the terminals 13 and winding 10. To reduce the heating effects on the core and to improve the output wave form, a resistor 31 is placed across the rectifier 30 or in parallel therewith or a condenser 32 is connected in parallel with the A. C. supply winding 10. Both the resistor and condenser may be used as indicated in this embodiment. The A. C. supply winding 10 in this embodiment is similarly mounted in the hollow core structure in the manner shown in Figures 2 and 3 and the D. C. signal winding 12 is positioned as a toroidal winding sectionally wound on the core structure. In this embodiment the fundamental A. C. output may be taken directly from the D. C. winding in the manner shown in connection with Figure 1 or a separate transformer may be used as indicated at 35 in Figure 5 in which its primary winding 36 of the transformer is connected in series with the winding 12 and the D. C. supply terminal 7 and its secondary winding 37 is connected to the A. C. output terminals 15. A condenser 38 is connected in parallel with the secondary winding 37 of the transformer 35 for filtering purposes.

In this embodiment, with the A. C. supply source rectified or the A. C. supply signal biased, the core structure 20, 21 will saturate only once for each cycle of the supply signal. Consequently the voltage generated in the output winding 37 of transformer 35 which is the D. C. supply signal of winding 12 modulated by the supply signal will have the same frequency as the A. C. supply.

Two cross field modulators or magnetic devices of the type described above may be connected so that a very large voltage gain between the D. C. signal and the A. C. output is obtained with an improved carrier wave form obtained by removing from the output the even harmonics of the carrier and so that the A. C. output is independent of the signal source impedance. In Figure 6, two cross field modulators are shown with the A. C. supply windings indicated at 10 and 10A energized from the same A. C. source 13 through half wave rectifiers 30 and 30A respectively. The supply windings are connected in parallel with the source 13, with the rectifiers in series with each respective winding such that the windings are energized for each half cycle of the supply signal only and with the rectifier so positioned that the windings 10 and 10A are energized on opposite half cycles of the supply. The D. C. windings of the respective modulators, indicated at 12 and 12A, are connected in series with one another to the D. C. signal source and are designed to be positioned as in the above mentioned embodiment normal to their respective A. C. winding. It will be understood that the magnetic core structures of the two modulators are magnetically independent of one another. In this embodiment, the individual modulators include also a separate output winding indicated herein at 40 and 40A positioned on the cores in inductive relationship with the signal windings 12, 12A and which are also adapted to be connected in series and in opposition to one another being connected to the output terminal 15 of this apparatus. It will be understood that the A. C. output signal could be obtained in the manner disclosed in Figure 1 directly from the combined series connected signal windings 12 and 12A or in the manner shown in Figure 5 from a transformer connected in series therewith. In this embodiment, the windings 40 and 40A have generated therein voltages of the fundamental frequency. All odd harmonics of the fundamental voltage subtract in the D. C. signal control circuit and add in A. C. output circuit, consequently impressing the odd harmonics on the output terminals. Even harmonics of the generated or fundamental voltage add in the control circuit and subtract in the output circuit. In this embodiment, the capacitor shown in the A. C. supply circuit of the embodiment of Figure 5 may also be included to improve wave form and reduce heating affects or a D. C. biased A. C. supply may be utilized in place of the half wave rectifiers.

In operation, this voltage amplifier operates in the same manner as the individual modulators described above operate. Saturation of the core due to the A. C. supply, which in this instance is biased, will take place only once during each cycle of the supply and the D. C. signal will be affected by the change in permeability of the core structure to induce in windings 40 and 40A a voltage in proportion to the magnitude of the supply signal. As noted above, the fundamental signal and all odd harmonics add in the output circuit and consequently the output from this device will be of the same frequency as that of the A. C. supply signal. Further, the fundamental and odd harmonics of the modulated signal output subtract across the D. C. signal source while the even harmonics of the modulated signal output add across the D. C. signal source, subtracting at the output circuit. This gives rise to improved wave form of output signal and makes the modulated signal output independent of D. C. signal source impedance. A second harmonic amplifier or output can be obtained by eliminating the rectifiers in series with the A. C. windings or the bias in the A. C. supply circuit and exciting the two cores by A. C. supply currents which are 90° out of phase.

In considering this invention it should be kept in mind that the present disclosure is intended to be illustrative only and that the scope of the invention is to be determined by the appended claims.

I claim as my invention:

1. A magnetic modulator comprising, a hollow toroidal shaped core, a first winding positioned within said hollow core and wound parallel to the plane of the circumference of said core, a second winding wound around said toroidal shaped core in the form of a toroid, means energizing said first named winding with an alternating current supply, means energizing said second named winding with a direct current signal source, and means including reactance electrically coupled to said direct current signal source and said second named winding, said last named means having a modulated direct current signal impressed on the same.

2. A magnetic modulator comprising, a hollow toroidal shaped core of non-uniform cross section, a first winding positioned within said hollow core and wound parallel to the plane of the circumference of said core, a second winding wound around said toroidal shaped core in the form of a toroid, means energizing said first named winding with an alternating current supply, means energizing said second named winding with a direct current signal source, and means including a reactance electrically coupled to said direct current signal source and said second named winding, said last named means having a modulated direct current signal impressed on the same, said toroidal core being so shaped that it is uniformly saturated by said alternating current positioned therein.

3. A magnetic modulator of the cross field type comprising, a hollow toroidal shaped core made of a powdered magnetic material having high magnetic permeability, a first winding positioned in said hollow core and wound circumferencially with respect thereto, said first winding energized from an alternating current supply, said hollow shaped core being so shaped in cross section that the area of the core seen by the alternating current winding is constant, a second winding wound on said toroidal shaped core normal to the extent or plane of said first winding and in the shape of a section of a toroid, said second winding energized by a direct current signal, and means including a reactance electrically coupled to said second winding, said means having an alternating signal impressed thereon which is proportional to said direct current signal modulated by said alternating current supply.

4. A magnetic modulator comprising, a hollow toroidal shaped core made of a powdered magnetic material having high magnetic permeability, a first winding positioned within said hollow core and wound parallel to the plane of the circumference of said core, a second winding wound around said toroidal shaped core in the form of a toroid, means energizing said first named winding with an alternating current supply, means energizing said second named winding with a direct current signal source, and transformer means having a primary winding connected in series with said direct current signal source and said second winding and having a secondary winding adapted to have said modulated direct current signal induced therein, said toroidal core being so shaped that it is uniformly saturated by the alternating current in the coil positioned therein.

5. A magnetic modulator comprising, a hollow toroidal shaped core made of a powdered magnetic material having high magnetic permeability, a first winding positioned within said hollow core and wound parallel to the plane of the circumference of said core, a second winding wound around said toroidal shaped core in the form of a toroid, means energizing said first named winding with an alternating current supply, means energizing said second named winding with a direct current signal source, third winding means electrically coupled to said second winding and having a modulated direct current signal impressed thereon, said hollow toroidal core being so shaped that it is uniformly saturated by the alternating current impressed on said first winding.

6. A magnetic modulator comprising, a hollow toroidal shaped core, a first winding positioned within said hollow core and wound parallel to the plane of the circumference of said core, a second winding wound around said toroidal shaped core in the form of a toroid, means energizing said first named winding with an alternating current supply, means electrically biasing said first named winding with the alternating current impressed thereon such that the saturation of said core takes place in one direction only, means energizing said second named winding with a direct current signal source, and means including a reactance electrically coupled to said direct current signal winding having a modulated direct current signal impressed thereon.

7. A magnetic modulator comprising, a hollow toroidal shaped core made of a powdered magnetic material having high magnetic permeability, a first winding positioned within said hollow core and wound parallel to the plane of the circumference of said core, a second winding wound around said toroidal shaped core in the form of a toroid, means energizing one of said windings with an alternating current supply, rectifier means connected to the alternating current supply and one of said windings such that saturation of said core takes place in one direction only, means energizing the other of said windings with a direct current signal source, means including reactance means electrically coupled to said other of said windings and having the modulated direct current signal impressed thereon, said hollow toroidal core being so shaped that it is uniformly saturated by the flux generated by said alternating current.

References Cited in the file of this patent

UNITED STATES PATENTS

| | | |
|---|---|---|
| 1,287,982 | Hartley | Dec. 17, 1918 |
| 1,561,782 | Given | Nov. 17, 1925 |
| 2,617,973 | Wolff et al. | Nov. 11, 1952 |
| 2,633,561 | Hewlett | Mar. 31, 1953 |
| 2,790,948 | Wennerberg | Apr. 30, 1957 |